D. M. LASLEY.
DIFFERENTIAL CLUTCH.
APPLICATION FILED MAY 12, 1913.

1,126,234.

Patented Jan. 26, 1915.
2 SHEETS—SHEET 1.

Witnesses
E. S. Hall.
Hazel Owen.

Inventor
Dana M. Lasley.

By
Bond + Miller
Attorney

D. M. LASLEY.
DIFFERENTIAL CLUTCH.
APPLICATION FILED MAY 12, 1913.
1,126,234.
Patented Jan. 26, 1915.
2 SHEETS—SHEET 2.
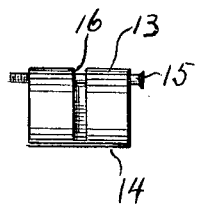
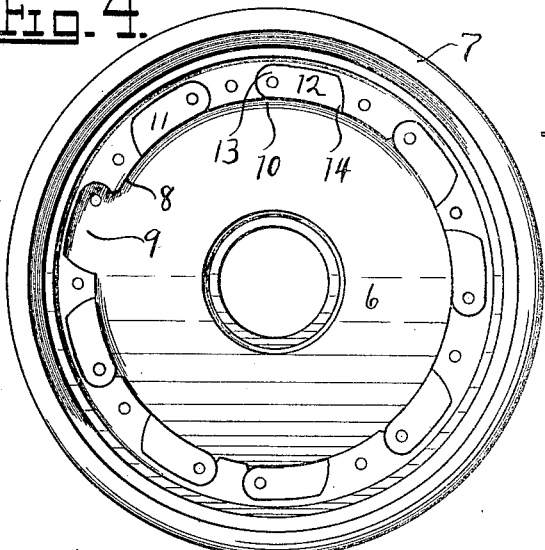
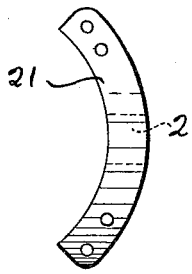
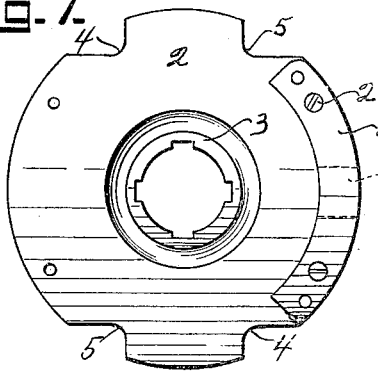
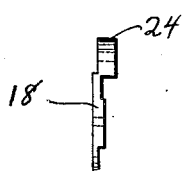
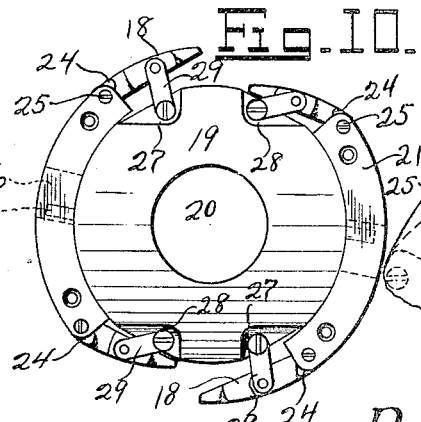
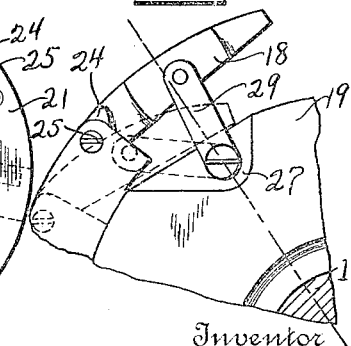
Witnesses
E. S. Hall.
Hazel Owen.
Inventor
Dana M. Lasley.
Bond & Miller
Attorneys

UNITED STATES PATENT OFFICE.

DANA M. LASLEY, OF CANTON, OHIO, ASSIGNOR TO THE DIFFERENTIAL CLUTCH COMPANY, OF CANTON, OHIO, A CORPORATION OF OHIO.

DIFFERENTIAL CLUTCH.

1,126,234.  Specification of Letters Patent.  Patented Jan. 26, 1915.

Application filed May 12, 1913. Serial No. 766,961.

*To all whom it may concern:*

Be it known that I, DANA M. LASLEY, a citizen of the United States, residing at Canton, in the county of Stark and State of Ohio, have invented a new and useful Differential Clutch, of which the following is a specification.

My invention relates to improvements in differential clutches principally adapted for use in pairs on motor vehicles and the like, although being also adapted for other uses, each clutch being adapted to automatically clutch a rotating member to a rotated member in either direction of rotation so long as said rotated member requires to be driven, but permitting the rotated member to overrun the rotating member under any condition tending to produce such action, such as turning around or traveling in a curved path in the case of motor vehicles and the like.

The objects of the invention are to generally improve devices of the character mentioned and especially to improve the construction illustrated and described in my application Serial No. 759,267, filed April 7, 1913, to simplify the construction of such devices and insure their more positive and certain operation and to provide a construction in which the wear of parts may be reduced to the minimum. These objects, together with other objects which will be understood by those skilled in the art, may be attained by the construction illustrated in the accompanying drawings, although the invention may be embodied in other forms, the construction illustrated being chosen by way of example.

Figure 1:
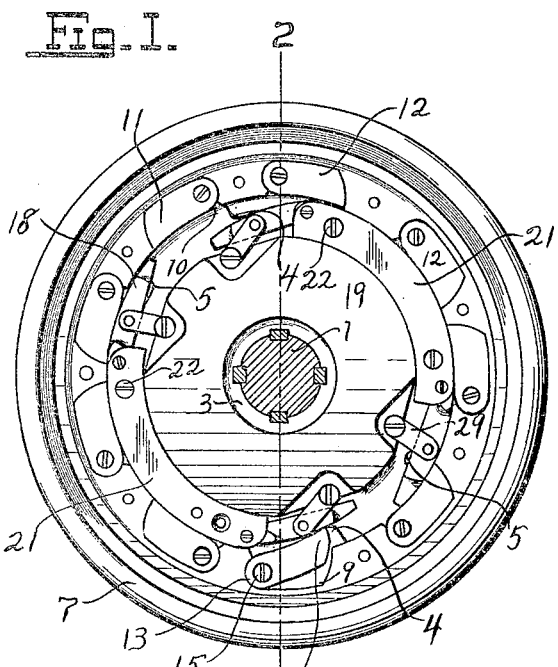
Figure 2:
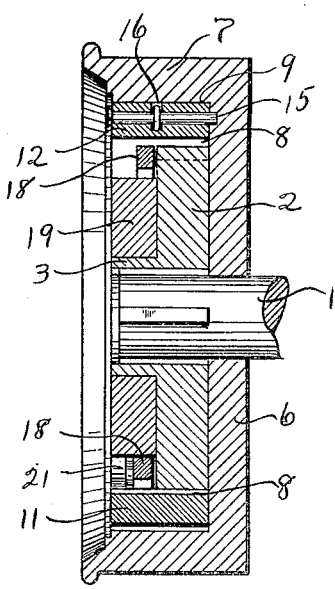
Figure 3:
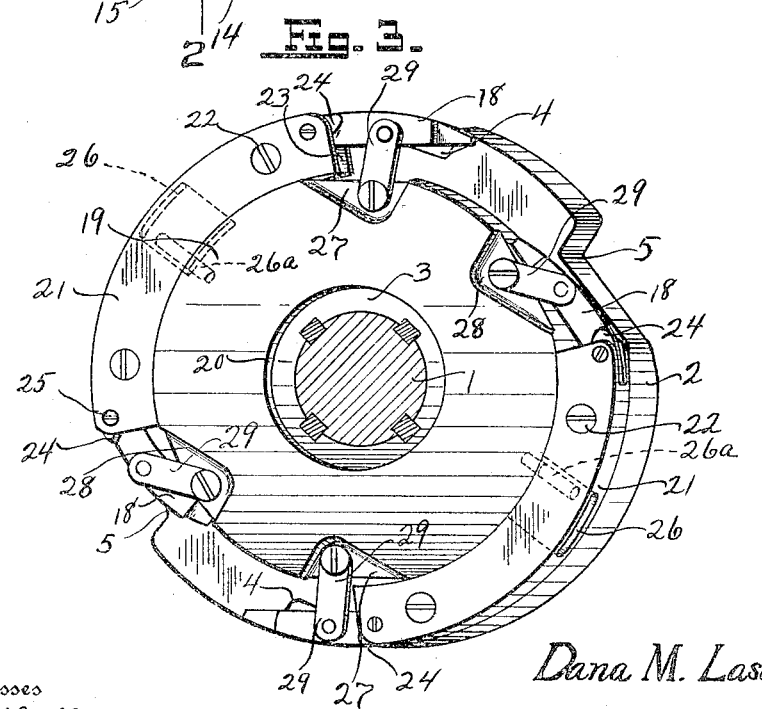

In the drawings Figure 1 is a side elevation of a differential clutch embodying my invention, the cover plate being removed to more fully disclose the construction. Fig. 2 is a cross sectional view on the line 2—2 of Fig. 1. Fig. 3 is a perspective view of the driving disk and controlling disk with the dog lifting members and connecting links and arcs. Fig. 4 is a side elevation of the outer or driven member of the clutch with all but one of the driving dogs in place. Fig. 5 is a detached outer-side view of one of the driving dogs. Fig. 6 is a detached enlarged view of one of the driving-dog-throwing springs. Fig. 7 is a side elevation of the driving disk showing one controlling-member-attaching-arc connected and one disconnected. Fig. 8 is a detached side view of one of said arcs. Fig. 9 is an inner side view of the same. Fig. 10 is a side elevation of the controlling disk with the controlling members, attaching links and controlling-member-attaching-arcs connected thereto. Fig. 11 is a detached view of one of the controlling members. Fig. 12 is an enlarged fragmentary view illustrating the movement of the controlling members.

Throughout the several views similar reference numerals indicate similar parts.

In this specification one complete differential clutch only will be described and from such description it will be readily apparent to those skilled in the art how a pair of such devices may be employed in the construction of motor vehicles and the like requiring differential mechanism.

More specifically describing the construction illustrated in the drawings, the numeral 1 indicates a shaft which, it will be assumed, is rotated by power. The driving member comprising the disk portion 2 and hub portion 3 is keyed to the shaft 1 and rotates therewith. The outer periphery of the disk 2 is concentric with the shaft 1 and said disk is provided with oppositely disposed driving notches, 4 and 5 respectively, arranged in oppositely disposed pairs, the notches 4 as well as the notches 5 being diametrically opposite each other on the disk, as clearly illustrated in Fig. 7.

The driven member of the clutch comprises a disk portion 6 rotatably mounted on the shaft 1 and the integral, annular flange portion 7 encircling the driving disk and having an inner periphery 8 closely adjacent the outer periphery of the disk portion 2, said inner periphery 8 being interrupted by the oppositely disposed driving dog recesses 9 and 10 in which the oppositely disposed driving dogs 11 and 12 are respectively arranged. Each of said driving dogs is provided with an attaching end 13 and a driving end 14, the attaching end being pivotally connected to the driven member by means of a pin 15. Each dog is provided with a curved inner face adapted to continue the curved inner periphery 8 of the portion 7 of the driven member when the dog is in its outer position, as clearly illustrated in Fig. 4.

The various dogs would not retain their outermost positions, as illustrated in Fig. 4, when the driving disk is removed as there illustrated, however, for each dog is provided with a longitudinal median kerf 16 exposing the pin 15, as illustrated in Fig. 5, and a spring, preferably formed of one and one-half turns of wire with free, straight ends, as illustrated in Fig. 6, is arranged with the pin 15 passing through the opening 17 and the free ends lying in the kerf 16, whereby the driving end 14 of each dog normally tends to spring inward beyond the outermost position in which the dogs in Fig. 4 are illustrated. This normally causes the driving ends of the dogs to bear against the outer periphery of the disk 2, and constantly tend to enter the driving notches if permitted to do so. It will be remembered that the dogs 11 and 12 and the notches 4 and 5 are oppositely disposed and that if one of the dogs 11 engages one of the notches 5 or one of the dogs 12 engages one of the notches 4 when the driving disk is rotating in the direction of the driving notch against the driving end of the dog, the driven member will be rotated with the shaft 1.

For the purpose of controlling the dogs 11 and 12 and preventing their entrance into the driving notches except under conditions when it is desirable that the driving member be connected to the driven member the dog controlling members 18 and controlling disk 19 with their associated members and connections are provided.

The disk 19 is provided with a central aperture 20 of sufficient diameter to receive the hub 3 of the driving member so that the controlling member may be rotatably mounted thereon as most clearly illustrated in Fig. 2. The diameter of the disk 9 is somewhat less than the diameter of the disk portion 2 of the driving member and connected to said disk portion 2 beyond the periphery of the disk 19 are the controlling member attaching arcs 21 which are of a thickness equal to the thickness of the disk 19, as clearly illustrated in Fig. 3. The attachment of said arcs to the disk portion 2 may be accomplished by the screws 22 or said arcs may be formed integrally with the portion 2. Both ends of each arc are provided with recesses 23 in each of which the hinged end 24 of a dog controlling member 18 is arranged and pivotally connected, as by means of the screw pins 25. Said end 24 is preferably off-set, as clearly illustrated in Fig. 11 to permit the member 18 to lie closely adjacent the disk portion 2 of the driving member. The outer edges of said dog controlling members are curved to conform to the outer periphery of the disk portion 2 when said members are in their outermost position, but said members are adapted to be pivotally moved upon the screw pins 25 into an inner position away from the said periphery. When the members 18 are in their outermost position their free ends extend beyond the limits of the driving notches, as clearly illustrated in Fig. 3, thus preventing any of the driving dogs from dropping into the notches so protected.

For the purpose of maintaining the controlling disk 19 in proper relative position with relation to the driving member, the arcs 21 are provided with slots 26 receiving pins 26ª connected to the disk 19 and adapted to move within the slots 26 when the disk portion 2 rotates relatively to the disk 19, but preventing any lateral displacement of the disk 19 with relation to the driving disk.

The controlling disk 19 is provided with recesses 27 and 28 corresponding in position substantially to the positions of the driving notches 4 and 5 in the disk 2. Pivotally connected to each dog controlling member intermediate its ends is the outer end of a link 29, the inner end of which link is pivotally connected to the controlling disk 19 within one of the recesses mentioned. The arrangement of parts is such that when the controlling members for the notches 4 are in their outermost positions the controlling members for the notches 5 are in their innermost positions, as illustrated in Fig. 3, so that the driving notches disposed in one direction are always exposed or unprotected by their controlling members when the oppositely disposed driving notches are fully covered or protected by their respective controlling members. It should be further noted that the arrangement and proportion of parts is such that when one of the controlling members is in its outer position the link 29 connecting the said member to the controlling disk is substantially radially disposed with reference to the shaft 1. In practice it is preferable that the inner end of said link pass slightly beyond the true radial or, in the language of those skilled in the art, " pass over the center," so that any inward pressure upon the controlling member so held in outward position will not tend to rotate the controlling disk in a direction to permit said controlling member to move inward, but will rather tend to urge said controlling disk to maintain its position to hold said controlling member in its said outermost position. By means of dotted and full lines I have clearly illustrated this feature in Fig. 12.

It will be understood that while relative rotation as between the driving disk 2 and the controlling disk 19 is possible, such rotation is limited by reason of the connection between said disks through the controlling members and links, for it will be understood that the free ends of the controlling members, as they move inwardly engage the outer edge of the controlling disk, as clearly illustrated in Figs. 3 and 10, thereby preventing further rotation of the disks 2 and 19 in the direction to draw said free ends inwardly.

It should be noted that the recesses 27 and 28 in the controlling disk and the offset construction of the members 18 permit the attachment of the links 29 to said disk and members without causing any part of the mechanism to project beyond the general plane of the inner side of the disk 19 and arcs 21.

It will be understood that differential clutches such as described are usually employed in pairs as in the case of motor vehicle construction and that when the driven member of one clutch has no work to do, while the corresponding member of the other clutch continues to have work to do, as in turning a corner in an automobile, the driven member will have a tendency to over-run in one of the clutches and by reason of the construction herein described will be free to do so until such a time as it again takes up further work or resistance, whereupon one of the driving dogs again automatically assumes the driving position.

In Fig. 1 the position of parts has been produced by a clock-wise rotation of the shaft 1 and driving disk, the driving disk at the same time moving the hinged ends of the controlling members to throw some of said members inwardly and others outwardly. It will be evident that further rotation in clock-wise direction will cause engagement of one of the driving dogs with one of the driving notches of the driving disk, and in fact the lowermost driving dog in Fig. 1, it will be noted, has moved inwardly to enter one of the notches 5. The engagement of said driving dog with the driving disk will produce rotation of the driven member in clock-wise direction, but if there be a tendency for said driven member to over-run it will be free to do so, the driving dog in the notch 5 merely moving out of the same into its outer position as it is moved in a direction from its driving end to attaching end, while the dog controlling members which are in their outermost position will prevent the oppositely disposed dogs from dropping into the notches 4 as the driven member over-runs.

With the parts in the position illustrated in Fig. 1 let it be assumed that the shaft 1 begins rotation in contra-clockwise direction. The shaft 1 will carry with it the driving disk from the very first instant of rotation, while the controlling disk will not begin its rotation so instantaneously. The relative rotation of the driving and controlling disks thus produced, although slight in extent, will be sufficient to move the dogs which are in their outermost position in Fig. 1 into the innermost position, and vice versa with respect to the other dogs. Such movement of the controlling members will uncover the driving notches 4 permitting one of the dogs 12 to drop into one of said notches for the purpose of operatively connecting the driven member to the shaft. In this direction of movement of the members over-running of the driven member is also equally possible so that it will be understood that in either direction of rotation of the shaft 1 the driven member will be connected thereto so long as it requires to be driven, but is free to over-run at any time when it has a tendency to do so.

It will be understood that many changes in design and detail of construction may be made as circumstances require or experience suggests without departing from the spirit of the present invention, within the scope of the appended claims.

I claim:—

1. A device of the character described comprising a driving member and a driven member, one of said members provided with driving notches and the other member provided with driving dogs adapted to enter said notches to clutch the members together, dog controlling members mounted upon the member provided with driving notches and adapted to be actuated to guard and to expose said notches and controlling-member-actuating means connected to said controlling members and adapted for limited rotation with reference to said driving member, the said controlling members being adapted to be actuated by said relative rotation.

2. A device of the character described comprising a driving member and a driven member, one of said members provided with driving notches and the other member provided with driving dogs adapted to enter said notches to clutch the members together, dog controlling members each pivotally connected at one end to the member provided with notches and each adapted to guard and to expose one of said notches and controlling-member-actuating means connected to said controlling members and adapted for limited rotation with reference to said driving member, the said controlling members being adapted to be actuated by said relative rotation.

3. A device of the character described comprising a driving member and a driven member, said driving member provided with driving notches and said driven member provided with driving dogs adapted to enter said notches to clutch the members together, dog controlling members pivotally mounted upon the driving member and adapted to guard and to expose said notches and controlling-member-actuating means connected to said controlling members and adapted for limited rotation with reference to said driving member, the said controlling members being adapted to be actuated by said relative rotation.

4. A device of the character described comprising, in combination with a rotatable shaft, a driving member fixedly connected thereto and provided with driving notches, a driven member rotatably connected to said shaft and provided with driving dogs adapted to enter said notches to clutch said driving and driven members together, a controlling disk connected to said shaft and adapted for limited rotation with relation to said driving member, dog controlling members pivotally mounted upon said driving member and adapted to guard and to expose said driving notches and connecting means between said dog controlling members and said controlling disk and adapted, when said controlling disk and driving member are relatively rotated, to actuate said dog controlling members.

5. A device of the character described comprising a driving member provided with driving notches, a driven member encircling said driving member provided with pivoted dogs adapted to move into and out of said notches and adapted, when in said notches to constitute clutch connection between said driving member and driven member, controlling members each pivotally connected at one end to said driving member and adapted to pivotally move upon said connection inwardly to expose said driving notches and outwardly to guard said driving notches against the entrance of said driving dogs, a controlling disk connected to said driving member and adapted for limited rotation with relation thereto and connecting means between said controlling disk and said controlling members and adapted to pivotally actuate said controlling members when said driving member is rotated with reference to said controlling disk.

6. A device of the character described comprising a driving member provided with a driving disk portion and a hub portion and having driving notches in said disk portion, a driven member encircling said driving disk, driving dogs pivotally connected to said driven member, driving dog actuating means urging said dogs into said driving notches, dog controlling members each pivotally connected at one end to the driving disk and adapted to be pivotally moved into position to span said notches to guard against the entrance of said driving dogs thereinto and into position to expose said notches to permit the entrance of said dogs thereinto, a controlling disk rotatably mounted upon said hub portion, and connecting means pivotally connecting said connecting members to said controlling disk, whereby relative rotation as between said driving disk and controlling disk will pivotally actuate said controlling members.

7. A device of the character described comprising, in combination with a rotatable shaft, a driving member fixedly connected to said shaft and provided with driving disk and hub portions and driving notches in said driving disk portion, a driven member encircling said driving member, driving dogs connected to said driven member and normally tending to enter said driving notches, dog controlling members each having one end pivotally connected to said driving disk and having the other end free, each controlling member adapted to be pivotally moved into outward position to span and guard one of said notches against the entrance of driving dogs thereinto and into inner position to expose said notch and permit the entrance of said driving dogs thereinto, a controlling disk rotatably mounted upon said hub portion and connecting links pivotally connected to said controlling disk and to said dog controlling members intermediate their ends, whereby relative rotation of said driving disk and controlling disk in one direction will move said dog controlling members outwardly and relative movement of said disks in the other direction will move said controlling members inwardly.

8. A device of the character described comprising, in combination with a rotatable shaft, a driving member fixedly mounted thereon and comprising a hub portion and a driving disk portion, said driving disk portion provided with driving notches, a driven member rotatably connected to said shaft and provided with driving dogs normally adapted to enter said driving notches to clutch said driving member and driven member together, said driving member provided with dog-controlling-member-attaching arcs intermediate said driving notches, dog controlling members pivotally connected to said arcs, each of said controlling members adapted to be pivotally moved to throw its free end outwardly to span and guard one of said notches against the entrance of said driving dogs and to throw its free end inwardly to expose said notch and permit the entrance of said driving dogs, a controlling disk rotatably mounted upon said hub portion and arranged between said arcs and connecting means connecting each of said controlling members at a point intermediate its ends with said controlling disk, whereby rotation of said driving member with relation to said controlling disk will pivotally actuate said controlling members, the point of pivotal connection between said connecting means and said controlling disk being adapted to move from a position on one side of a radial line from the axis of said shaft through the point of pivotal connection between said connecting means and said controlling member to the other side of said radial line when said controlling member moves from its inner position to its outer position.

9. A device of the character described comprising a driving member, a driven member, driving dogs connected to one of said members, driving notches in the other member, said dogs adapted to move into and out of said notches and adapted, when in said notches, to constitute driving connection between said driving member and driven member, controlling members, each pivotally connected at one end to said driving member and adapted to pivotally move to expose and to guard said driving notches to permit and prevent the entrance of said driving dogs thereinto, a controlling disk adapted for limited rotation with relation to said driving member, means for preventing separation of said controlling disk from said driving member, while permitting said limited rotation, and connecting means between said controlling disk and said controlling members and adapted to actuate said controlling members when said driving member is rotated with reference to said controlling disk.

In testimony that I claim the above, I have hereunto subscribed my name in the presence of two witnesses.

DANA M. LASLEY.

Witnesses:
LORIN C. WISE,
WILLIAM H. MILLER.

Copies of this patent may be obtained for five cents each, by addressing the "Commissioner of Patents, Washington, D. C."